United States Patent
Toler (10) Patent No.: US 11,912,429 B2
(45) Date of Patent: Feb. 27, 2024

(54) SYSTEM AND METHODOLOGY TO PROVIDE AN AUGMENTED VIEW OF AN ENVIRONMENT BELOW AN OBSTRUCTING STRUCTURE OF AN AIRCRAFT

(71) Applicant: Gulfstream Aerospace Corporation, Savannah, GA (US)

(72) Inventor: Brian Toler, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

(21) Appl. No.: 17/658,067

(22) Filed: Apr. 5, 2022

(65) Prior Publication Data
US 2023/0312129 A1 Oct. 5, 2023

(51) Int. Cl.
*G02B 27/00* (2006.01)
*B64D 43/00* (2006.01)
(Continued)

(52) U.S. Cl.
CPC ............. *B64D 43/00* (2013.01); *B64D 47/08* (2013.01); *G02B 27/0101* (2013.01); *H04N 13/239* (2018.05); *H04N 13/302* (2018.05); *H04N 23/80* (2023.01); *G02B 27/017* (2013.01); *G02B 2027/014* (2013.01); *G02B 2027/0138* (2013.01)

(58) Field of Classification Search
CPC .... B64D 43/00; B64D 47/08; G02B 27/0101; G02B 27/017; G02B 2027/0138; G02B 2027/014; H04N 13/239; H04N 13/302; H04N 23/80
See application file for complete search history.

(56) References Cited

U.S. PATENT DOCUMENTS 7,884,977 B2 * 2/2011 Mori ...................... H04N 19/12
358/538
8,086,044 B2 * 12/2011 Feng .................... H04N 19/176
382/220
(Continued)

FOREIGN PATENT DOCUMENTS

EP 3794927 A1 3/2021

OTHER PUBLICATIONS

"http://web.archive.org/web/20220124205849/https://www.businessinsider.com/why-airplanes-have-cameras-what-they-do-where-to-find-2022-1".*

*Primary Examiner* — Frank F Huang
(74) *Attorney, Agent, or Firm* — LKGLOBAL | Lorenz & Kopf, LLP (57) ABSTRACT

A display system is provided for a vehicle having a windshield and vehicle structure outside the windshield. The vehicle structure is visible within a field of view defined by the windshield. Certain embodiments of the display system include: a camera to capture image data for a visually obstructed portion of an environment outside the vehicle, wherein the visually obstructed portion of the environment is hidden by the vehicle structure; a controller configured to process the image data captured by the camera into a head-up display (HUD) image that represents the visually obstructed portion of the environment; a HUD element configured to present projected images that are visible to an occupant of the vehicle; and a projector coupled to the controller and configured to project the HUD image toward the HUD element, such that the HUD image is visible overlying the vehicle structure.

13 Claims, 6 Drawing Sheets

(51) Int. Cl.
*H04N 13/302* (2018.01)
*H04N 13/239* (2018.01)
*H04N 23/80* (2023.01)
*B64D 47/08* (2006.01)
*G02B 27/01* (2006.01)

(56) References Cited

U.S. PATENT DOCUMENTS

| | | | |
|---|---|---|---|
| 8,711,220 B2* | 4/2014 | Tiana | H04N 7/18 348/148 |
| 8,803,727 B2* | 8/2014 | Muensterer | G01S 17/93 342/63 |
| 8,878,773 B1* | 11/2014 | Bozarth | G06V 10/143 382/103 |
| 9,274,597 B1* | 3/2016 | Karakotsios | G06F 3/0346 |
| 9,390,559 B2* | 7/2016 | Feyereisen | B64D 45/00 |
| 9,557,568 B1* | 1/2017 | Ouderkirk | G02B 27/0081 |
| 10,001,376 B1* | 6/2018 | Tiana | G01C 23/005 |
| 10,217,286 B1* | 2/2019 | Angel | G06F 3/013 |
| 10,298,840 B2* | 5/2019 | Guenter | H04N 23/667 |
| 10,354,140 B2* | 7/2019 | Guenter | G06F 18/22 |
| 10,466,484 B1* | 11/2019 | Yoon | H04N 13/332 |
| 10,466,779 B1* | 11/2019 | Liu | G02B 27/0093 |
| 10,502,963 B1* | 12/2019 | Noble | B29D 11/0073 |
| 10,504,397 B2* | 12/2019 | Guenter | G09G 3/006 |
| 10,920,749 B2* | 2/2021 | Grunnet | G06T 17/00 |
| 11,176,367 B1* | 11/2021 | Fix | G06T 7/521 |
| 11,187,909 B2* | 11/2021 | Guenter | G02B 27/0179 |
| 2003/0127557 A1 | 7/2003 | Anderson et al. | |
| 2005/0099433 A1 | 5/2005 | Berson et al. | |
| 2008/0143820 A1* | 6/2008 | Peterson | G06T 11/60 348/E7.001 |
| 2008/0212942 A1* | 9/2008 | Gordon | H04N 21/4334 348/E7.071 |
| 2009/0196460 A1* | 8/2009 | Jakobs | G06V 40/19 382/103 |
| 2011/0234750 A1* | 9/2011 | Lai | G03B 37/04 348/E7.001 |
| 2012/0249957 A1* | 10/2012 | Shibata | A61B 3/0025 351/206 |
| 2012/0250980 A1* | 10/2012 | Gillard | H04N 19/46 382/173 |
| 2012/0254369 A1* | 10/2012 | Gillard | H04N 21/4756 709/219 |
| 2012/0257005 A1* | 10/2012 | Browne | G02B 27/017 348/E7.001 |
| 2013/0050485 A1* | 2/2013 | Tiana | G06T 7/0002 348/148 |
| 2013/0182066 A1* | 7/2013 | Ishimoto | E02F 9/261 348/38 |
| 2014/0037213 A1* | 2/2014 | Niederberger | G06T 11/00 382/195 |
| 2014/0049452 A1* | 2/2014 | Maltz | G02B 27/017 345/8 |
| 2016/0029883 A1* | 2/2016 | Cox | G06V 40/19 351/209 |
| 2016/0085300 A1* | 3/2016 | Robbins | G06F 3/013 345/633 |
| 2016/0225192 A1* | 8/2016 | Jones | G06F 3/012 |
| 2016/0241892 A1* | 8/2016 | Cole | G06T 15/04 |
| 2016/0342205 A1* | 11/2016 | Shigeta | G06V 10/147 |
| 2016/0377862 A1 | 12/2016 | Zimmerman et al. | |
| 2017/0038583 A1 | 2/2017 | Kim et al. | |
| 2017/0182942 A1 | 6/2017 | Hardy et al. | |
| 2018/0046859 A1* | 2/2018 | Jarvenpaa | H04N 23/56 |
| 2018/0275409 A1* | 9/2018 | Gao | G06T 19/006 |
| 2018/0307048 A1* | 10/2018 | Alexander | G03H 1/26 |
| 2019/0086674 A1* | 3/2019 | Sinay | G02B 27/283 |
| 2020/0183174 A1* | 6/2020 | Noui | G06F 3/013 |
| 2020/0193626 A1 | 6/2020 | Tsurumi | |
| 2020/0368616 A1* | 11/2020 | Delamont | G06F 3/011 |
| 2021/0011284 A1* | 1/2021 | Andreev | G02B 27/0179 |
| 2021/0041948 A1* | 2/2021 | Berkner-Cieslicki | G06F 3/011 |
| 2022/0197376 A1* | 6/2022 | Boyle | G06F 3/013 |
| 2022/0382064 A1* | 12/2022 | Rohn | G02B 1/002 |
| 2022/0394234 A1* | 12/2022 | Etigson | G02B 30/10 |
| 2022/0397956 A1* | 12/2022 | Lundell | G06F 3/013 |
| 2022/0413302 A1* | 12/2022 | Meitav | G06F 3/013 |
| 2022/0413603 A1* | 12/2022 | Held | G02B 27/0093 |

\* cited by examiner

SYSTEM AND METHODOLOGY TO PROVIDE AN AUGMENTED VIEW OF AN ENVIRONMENT BELOW AN OBSTRUCTING STRUCTURE OF AN AIRCRAFT

TECHNICAL FIELD

Embodiments of the subject matter described herein relate generally to vehicle display and instrumentation systems. More particularly, embodiments of the subject matter relate to a head-up display (HUD) system suitable for use in an aircraft.

BACKGROUND

A human operated vehicle (such as an automobile, a train, or an aircraft) has a cockpit, cabin, bridge, or seating area for the operator. A windshield, screen, or window arrangement allows the operator to view the environment outside of the vehicle. However, some vehicles have features, structures, or components that reside within the field of view of the operator. For example, an aircraft may include a nose cone (and/or other aircraft structure) that extends forward into the field of view of the pilot. Consequently, some or all of the nose cone can obstruct the view of the underlying terrain or environment, e.g., the ground, a runway, landmarks, or the like.

It is desirable to provide improved visibility for an operator of a vehicle having a visual obstruction of the type mentioned above. One proposed solution utilizes a control system that mechanically alters the physical position of the obstructing structure or component. Another proposed solution utilizes a control system that mechanically alters the seating position (viewpoint) of the operator in a way that enables the operator to see "around" the obstructing structure or component.

BRIEF SUMMARY

An aircraft is disclosed here. Certain embodiments of the aircraft include: a cockpit to accommodate an occupant; a windshield that defines a field of view for viewing an environment outside the cockpit; an aircraft structure outside the cockpit and visible within the field of view, wherein the aircraft structure visually obstructs a portion of the environment; an imaging system to capture image data corresponding to the obstructed portion of the environment; a controller configured to process the image data captured by the imaging system into a head-up display (HUD) image that represents the obstructed portion of the environment; a HUD element configured to present projected images that are visible to the occupant; and a projector coupled to the controller and configured to project the HUD image toward the HUD element, such that the HUD image is visible overlying the aircraft structure.

Also disclosed is a display system for a vehicle having a windshield and vehicle structure outside the windshield, wherein the vehicle structure is visible within a field of view defined by the windshield. Certain embodiments of the display system include: a camera to capture image data for a visually obstructed portion of an environment outside the vehicle, wherein the visually obstructed portion of the environment is hidden by the vehicle structure; a controller configured to process the image data captured by the camera into a head-up display (HUD) image that represents the visually obstructed portion of the environment; a HUD element configured to present projected images that are visible to an occupant of the vehicle; and a projector coupled to the controller and configured to project the HUD image toward the HUD element, such that the HUD image is visible overlying the vehicle structure.

Also disclosed is a head-up display (HUD) system for a vehicle having a windshield and visually obstructing vehicle structure outside the windshield, wherein the vehicle structure is visible within a field of view defined by the windshield. Certain embodiments of the HUD system include: a transparent combiner that is deployable into the field of view defined by the windshield, the transparent combiner configured to present projected images that are visible to an occupant of the vehicle; a controller configured to process image data into a HUD image that represents a visually obstructed portion of an environment outside the vehicle, the image data captured by an imaging system having a captured field of view that is unobstructed by the visually obstructing vehicle structure; and a projector coupled to the controller and configured to project the HUD image toward the transparent combiner, such that the HUD image is visible overlying the visually obstructing vehicle structure.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in at least one tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to vehicle control and navigation systems, vehicle display systems (including HUD systems), vehicle instrumentation systems, the processing of image data, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A vehicle-based display system and related operating methodologies are disclosed herein. In accordance with certain non-limiting embodiments, the system is deployed onboard an aircraft such as an airplane. However, it should be appreciated that embodiments of the disclosed system can be utilized for other vehicle applications including, without limitation: trains; helicopters; automobiles; watercraft; monorails; amusement park rides; transportation systems; ski lifts; or the like.

Figure 1:
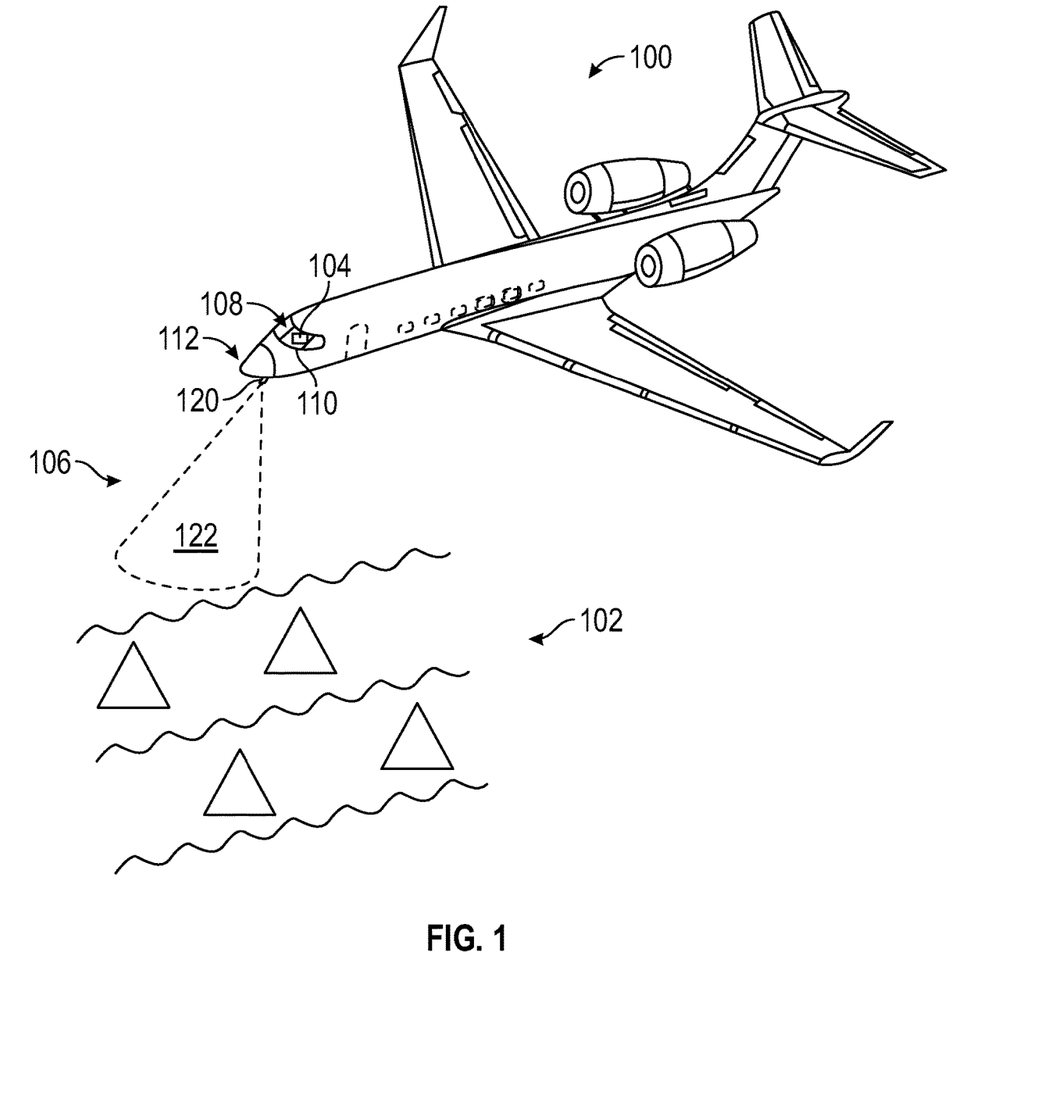
FIG. 1 is a diagram that depicts an aircraft flying above terrain.

FIG. 1 is a diagram that depicts an exemplary embodiment of an aircraft 100 flying above terrain 102. The aircraft 100 includes or cooperates with one or more onboard aircraft systems 104, which may include, without limitation, any of the following in combination and in any number of iterations or multiples: a flight control system; a navigation system; an instrumentation system; a display system (such as a HUD system); an alerting system; a messaging or notification system for the flight crew; a global positioning system (GPS) receiver; various sensor devices or components. FIG. 1 represents the various onboard aircraft systems 104 as a single block, but it should be understood that an embodiment of the aircraft 100 will implement the onboard aircraft systems 104 with a variety of different physical, logical, and computer-implemented components.

In certain embodiments, the onboard aircraft systems 104 include a HUD system that is suitably configured and operated to provide an enhanced, augmented, supplemented, and/or synthetic view of an environment 106 outside a cockpit 108 of the aircraft 100. The cockpit 108 accommodates at least one occupant of the vehicle, e.g., a pilot. The aircraft 100 includes a windshield 110 that defines a field of view that allows the occupant to view the environment 106 from a vantage point inside the cockpit 108. Thus, when weather conditions are clear enough, an occupant inside the cockpit 108 can view the outside environment 106 through the windshield 110 of the aircraft 100.

The depicted embodiment of the aircraft 100 includes at least one aircraft structure 112 (e.g., one or more components, surfaces, and/or features) outside the cockpit 108 and visible within the field of view defined by the windshield 110, wherein the aircraft structure 112 visually obstructs a portion of the environment 106 from the viewpoint of an occupant inside the cockpit 108. For this particular example, the aircraft structure 112 corresponds to the nose cone or a portion of the nose cone of the aircraft 100. Certain nose cone configurations can extend into the pilot's field of view, which visually blocks a portion of the ground, terrain, or environment 106 located below the nose cone.

The subject matter disclosed here employs HUD technology to provide an unobstructed view of the environment 106 that resides below the obstructing aircraft structure 112. To this end, the aircraft 100 includes an imaging system 120 to capture image data corresponding to the hidden portion of the environment 106. FIG. 1 schematically illustrates the imaging system 120 capturing image data that encompasses a zone 122 underneath the aircraft structure 112. The zone 122 will typically cover an area that is larger than the visually obstructed area. In certain embodiments, the imaging system 120 includes at least one camera having a captured field of view (corresponding to the zone 122) located below the nose cone. A single camera can be used in a basic deployment of the imaging system 120. In other implementations, at least one left camera and at least one right camera can be used in the imaging system 120 to provide a perception of depth, three dimensions, and/or a stereoscopic HUD image. For such implementations, a controller or processor associated with the imaging system 120 processes the image data captured by the left and right cameras into an appropriate stereoscopic or three dimensional image that can be displayed as a HUD image and/or displayed with a head-mounted display system (e.g., active glasses, a visor display, or the like).

Figure 2:
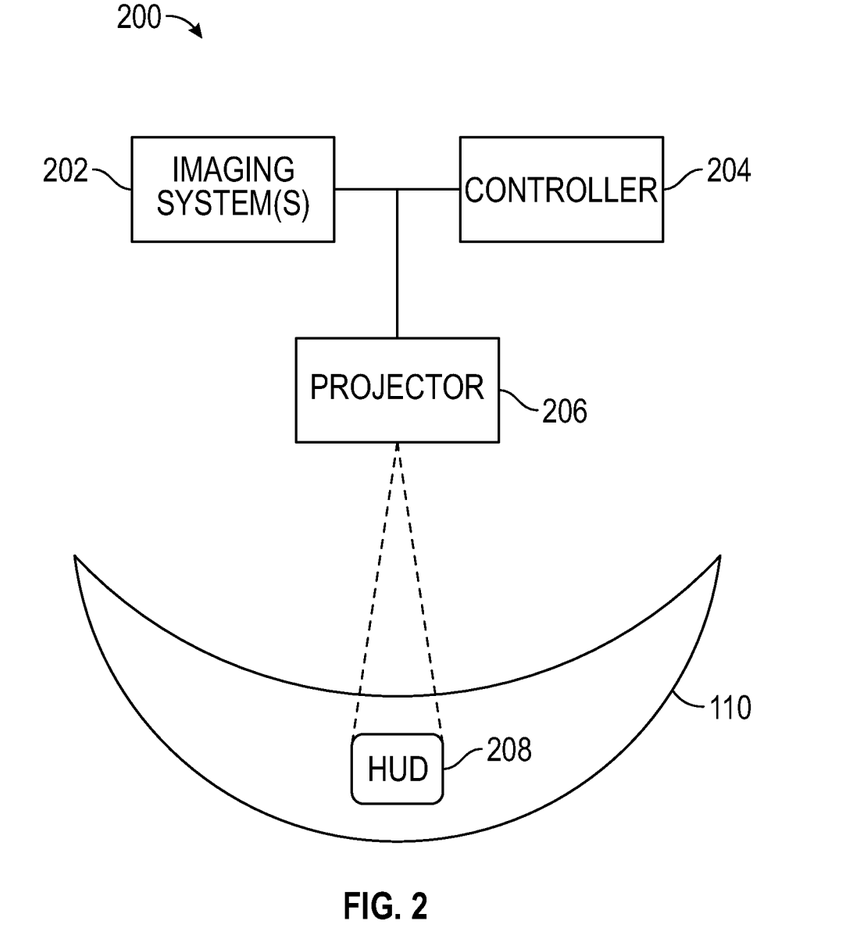
FIG. 2 is a simplified block diagram representation of a HUD system configured in accordance with certain embodiments of the invention.

FIG. 2 is a simplified block diagram representation of a HUD system 200 configured in accordance with certain embodiments of the invention. FIG. 2 depicts various systems and components that may be onboard the aircraft 100. Indeed, the onboard aircraft systems 104 shown in FIG. 1 may include any or all of the components depicted in FIG. 2. The illustrated embodiment of the HUD system 200 includes, without limitation: at least one imaging system 202; a controller 204; a projector 206; and a HUD element 208. A deployed implementation of the HUD system 200 may include some or all of these components, additional systems and components (as needed or desired), and/or alternative systems and components (as needed or desired). FIG. 2 is merely an illustrative example that depicts certain systems and components that support the inventive subject matter described herein.

An imaging system 202 as shown in FIG. 2 can be implemented as the imaging system 120 depicted in FIG. 1. The imaging system(s) 202 are configured, arranged, and controlled to capture image data corresponding to a visually obstructed portion of the environment 106 outside the aircraft 100. For the exemplary embodiment described here, the at least one imaging system 202 includes a camera that captures image data (pictures and/or video) for processing by the HUD system 200. Alternatively or additionally, an imaging system 202 of the HUD system 200 may include, without limitation: an infrared camera or sensor; a radar system; a lidar system; or the like. The image data captured by the imaging system(s) 202 can be processed by the controller 204 into any suitable format or representation. In this regard, the HUD system 200 may be configured to present realistic video/image information as captured by a camera, synthetic vision graphics, a rasterized graphical representation of terrain or other features in the environment 106, or icons that represent terrain or other features in the environment 106.

The controller 204 is configured to process the image data captured by the imaging system(s) 202 into a corresponding HUD image that represents the visually obstructed portion of the environment 106. In certain implementations, the controller 204 processes the image data in an appropriate manner to register the generated HUD image with an unobstructed view of the environment outside the cockpit 108. In other words, the controller 204 generates and "aligns" the HUD image such that it appears to accurately merge with the visible surroundings when perceived by the viewing occupant. The controller 204 may include any combination of software and hardware. For example, the controller 204 may include an application specific integrated circuit (ASIC), an electronic circuit, a processor (shared, dedicated, or group) and memory that execute one or more software or firmware programs, a combinational logic circuit, and/or other suitable components that provide the described functionality.

The HUD system 200 may utilize information or data obtained from any number of sensors (not shown) disposed throughout the aircraft 100. For example, the controller 204 may use GPS or navigation data associated with a current location or position of the aircraft 100. As another example, the controller may use configuration or setting data that indicates any of the following, without limitation: a seating position of the viewing occupant; an eye location of the viewing occupant; a head location of the viewing occupant; body movement of the viewing occupant; height of the viewing occupant; a line of sight of the viewing occupant; or the like. Furthermore, the controller 204 may be configured to adjust an image capture angle of the imaging system(s) 202 based on the eye or head location of the occupant and/or in response to changes in the eye or head location of the occupant. In this regard, the controller 204 can be operatively coupled to the imaging system(s) 202 to facilitate appropriate adjustment (mechanical, optical, and/or electronic adjustments) as needed.

The projector 206 is coupled to the controller, and is configured to project HUD images toward the HUD element 208, such that the HUD image is visible overlying the obstructing aircraft structure 112. The HUD element 208 is configured, arranged, and positioned to present projected images that are visible to the viewing occupant. In certain embodiments, the HUD element 208 is realized as a transparent (or substantially transparent) optical combiner. Moreover, the HUD element 208 may be implemented as a component that is deployable on demand into the field of view defined by the windshield 110. Alternatively or additionally, the HUD element 208 can be integrated into the windshield 110 (rather than as a physically distinct component). The HUD element 208 causes projected light to form a visible pattern or image arrangement having a focal point that is perceived to be well in the distance. Accordingly, the viewing occupant is able to perceive the HUD image arrangement while also seeing objects through the clear HUD element 208.

When oriented in the cockpit 108 of the aircraft 100, the projector 206 and the HUD element 208 are oriented at angles such that at least some of the projected light is redirected towards the viewing occupant. In certain deployments, the HUD element 208 is disposed in front of and offset to one side of the viewing occupant. In the example provided, the HUD element 208 is realized as a single piece of transparent material, although multiple pieces of transparent material can be used.

Figure 3:
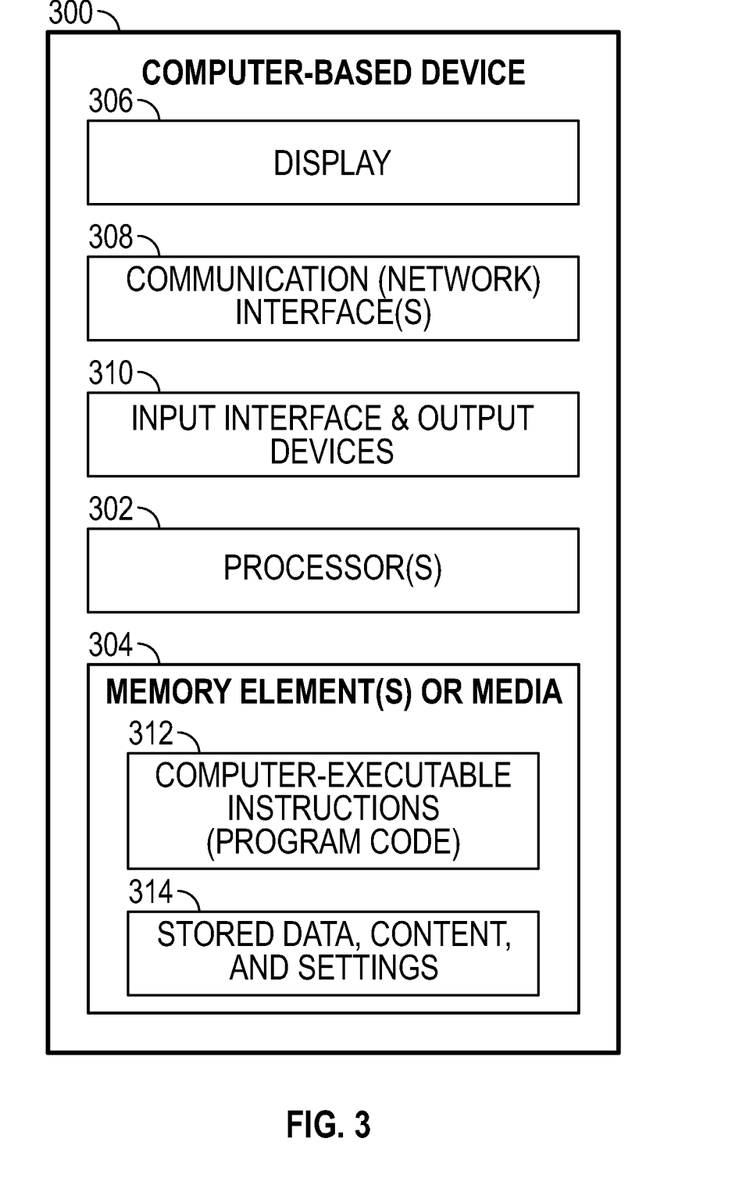
FIG. 3 is a block diagram of an exemplary embodiment of a computer-based device.

In accordance with certain embodiments, an aircraft system 104 depicted in FIG. 1, and one or more of the items depicted in FIG. 2 can be implemented as at least one computer-based or a processor-based device, system, or piece of equipment. In this regard, FIG. 3 is a simplified block diagram representation of an exemplary embodiment of a computer-based device 300, which may be used to implement certain devices or systems onboard the aircraft 100.

The device 300 generally includes, without limitation: at least one processor 302; at least one memory storage device, storage media, or memory element 304; a display 306; at least one communication (network) interface 308; and input and output (I/O) devices 310, such as an input interface, one or more output devices, one or more human/machine interface elements, or the like. In practice, the device 300 can include additional components, elements, and functionality that may be conventional in nature or unrelated to the particular application and methodologies described here.

A processor 302 may be, for example, a central processing unit (CPU), a field programmable gate array (FPGA), a microcontroller, an application specific integrated circuit (ASIC), or any other logic device or combination thereof. One or more memory elements 304 are communicatively coupled to the at least one processor 302, and can be implemented with any combination of volatile and non-volatile memory. The memory element 304 has non-transitory machine-readable and computer-executable instructions (program code) 312 stored thereon, wherein the instructions 312 are configurable to be executed by the at least one processor 302 as needed. When executed by the at least one processor 302, the instructions 312 cause the at least one processor 302 to perform the associated tasks, processes, and operations defined by the instructions 312. Of course, the memory element 304 may also include instructions associated with a file system of the host device 300 and instructions associated with other applications or programs. Moreover, the memory element 304 can serve as a data storage unit for the host device 300. For example, the memory element 304 can provide storage 314 for aircraft data, navigation data, sensor data, measurements, image and/or video content, settings or configuration data for the aircraft, and the like.

The display 306 (if deployed with the particular embodiment of the device 300) may be integrated with the device 300 or communicatively coupled to the device 300 as a peripheral or accessory component. The shape, size, resolution, and technology of the display 306 will be appropriate to the particular implementation of the device 300. The display 306 can be realized as a monitor, touchscreen, or another conventional electronic display that is capable of graphically presenting data and/or information provided by the device 300.

The communication interface 308 represents the hardware, software, and processing logic that enables the device 300 to support data communication with other devices. In practice, the communication interface 308 can be suitably configured to support wireless and/or wired data communication protocols as appropriate to the particular embodiment. For example, the communication interface 308 can be designed to support an aircraft network protocol, a cellular communication protocol, a short-range wireless protocol (such as the BLUETOOTH communication protocol), and/or a WLAN protocol. As another example, if the device 300 is a desktop or laptop computer, then the communication interface can be designed to support the BLUETOOTH communication protocol, a WLAN protocol, and a LAN communication protocol (e.g., Ethernet). In accordance with certain aircraft applications, the communication interface 308 is designed and configured to support one or more onboard network protocols used for the communication of information between devices, components, and subsystems of the aircraft 100.

The I/O devices 310 enable the user of the device 300 to interact with the device 300 as needed. In practice, the I/O devices 310 may include, without limitation: an input interface to receive data for handling by the device 300; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device. In this context, a touchscreen display 306 can be categorized as an I/O device 310. Moreover, a touchscreen display 306 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

Figure 4:
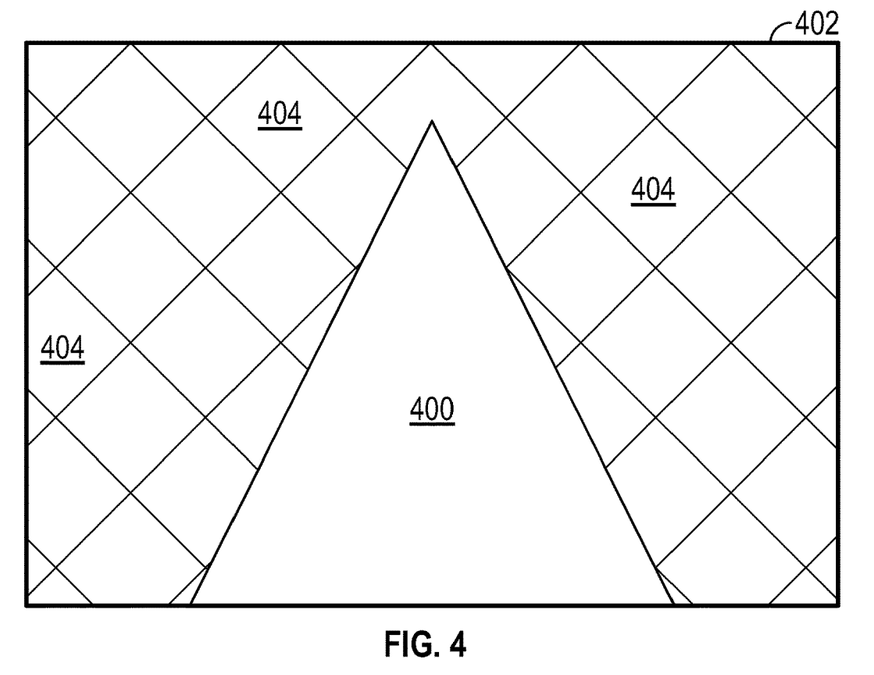
FIG. 4 is a diagram that depicts a nose cone of an aircraft that visually obstructs a portion of the view through the windshield of the aircraft.

As described above with reference to FIG. 1, the HUD system 200 is configured and operated in an appropriate manner to process and generate HUD image content that corresponds to a portion of the surrounding environment 106 that would otherwise be hidden or blocked by aircraft structure 112 located in the field of view from the cockpit 108. In this regard, FIG. 4 is a diagram that schematically depicts a nose cone 400 of an aircraft that visually obstructs a portion of the view through the windshield 402 of the aircraft. In FIG. 4, the crosshatched area represents the visible portion of the environment 404 outside the aircraft and below the nose cone 400. The nose cone 400 visually obstructs some of the underlying environment 404. Accordingly, the crosshatched pattern does not appear within the area defined by the nose cone 400.

Figure 5:
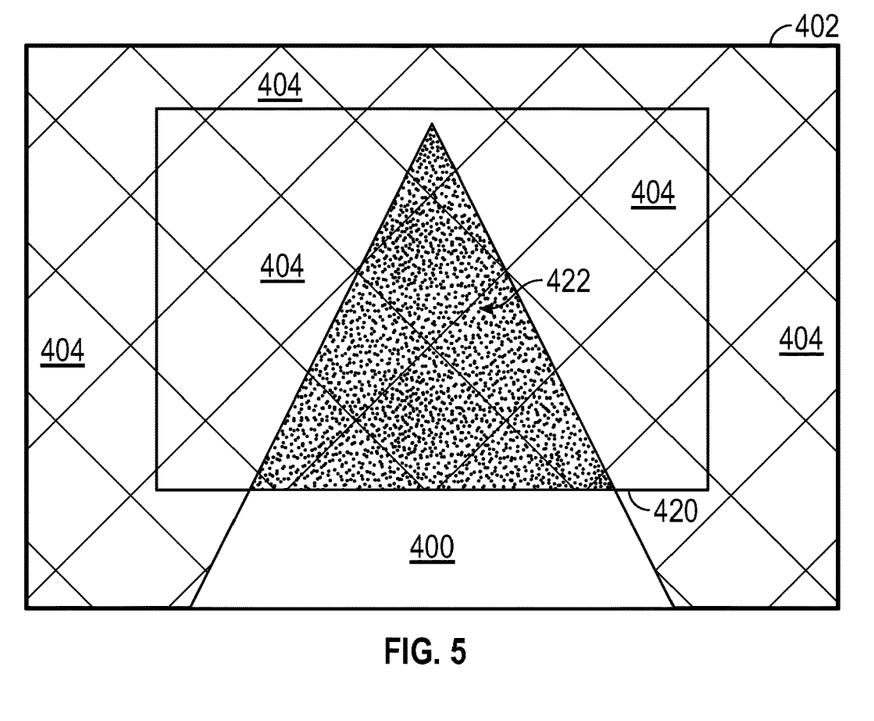
FIG. 5 is a diagram that depicts the scene shown in FIG. 4 after deployment of a HUD system that is controlled to project a HUD image that represents the obstructed portion of the environment.

FIG. 5 is a diagram that depicts the scene shown in FIG. 4 after deployment of a HUD system 420 that is controlled to project a HUD image 422 that represents the obstructed portion of the environment 404. The HUD system 420 is positioned within the field of view defined by the windshield 402 such that some of the environment 404 and some of the nose cone 400 remain visible in plain view (the area outside of the rectangle that represents the HUD system 420). As mentioned above, the HUD system 420 employs a clear or transparent combiner, which still provides a clear view of the portion of the environment 404 that is unobstructed by the nose cone 400. The crosshatched area inside the perimeter of the HUD system 420 corresponds to the portion of the environment 404 that remains visible through the combiner. For this schematic example, the stippled and crosshatched area represents the HUD image 422, which appears to be superimposed over the forward section of the nose cone 400. Thus, even though the viewing occupant sees the forward section of the nose cone through the combiner of the HUD system 420, the HUD image 422 provides a view of the terrain or environment 404 that resides underneath the nose cone 400. Although FIG. 5 depicts the HUD image 422 precisely registered and aligned with the outline of the nose cone 400, such precision need not (and typically will not) be achieved. Rather, the boundary of the HUD image 422 may extend beyond the perimeter of the obstructing structure, such that it overlaps some of the environment 404 that remains in plain view through the combiner of the HUD system 420.

Figure 6:
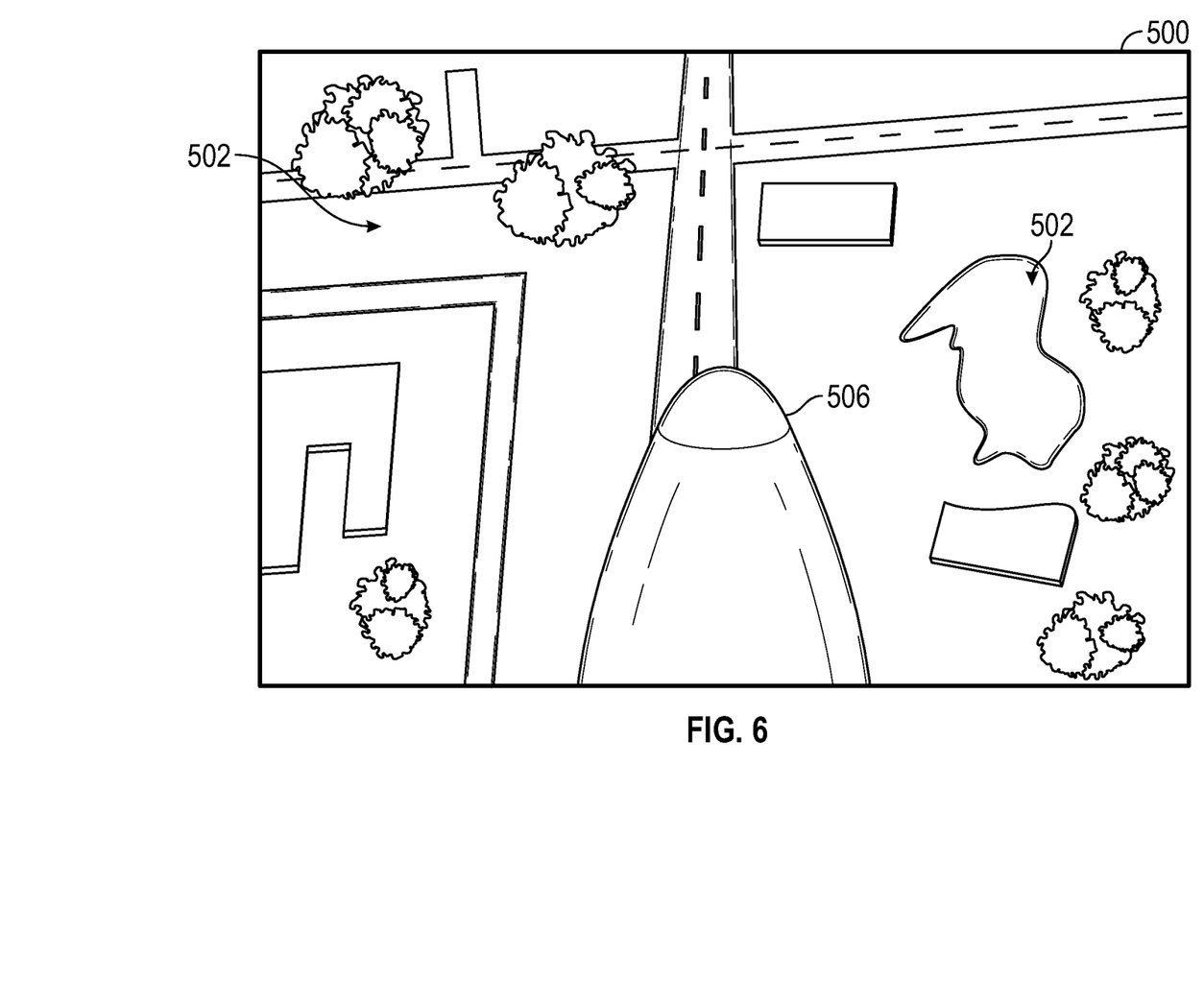
FIG. 6 is a schematic representation of an obstructed view through the windshield of an aircraft.
Figure 7:
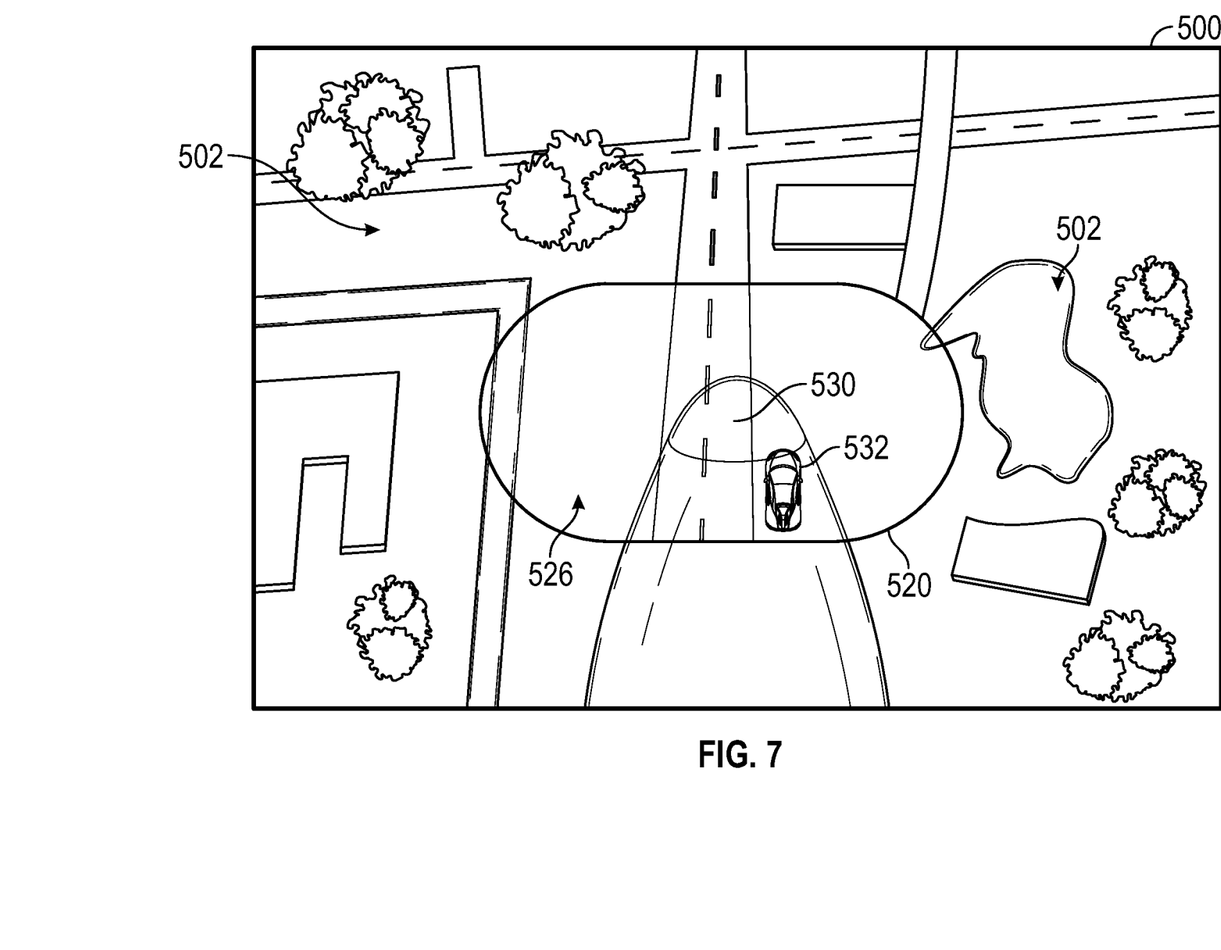
FIG. 7 is a schematic representation of the scene shown in FIG. 6 after deployment of a HUD system that is controlled to project a HUD image that represents the obstructed portion of the environment.

FIG. 6 is a schematic representation of an obstructed view through the windshield 500 of an aircraft. FIG. 6 is similar to FIG. 4 in that most of the environment 502 outside the windshield 500 is visible, while some of the environment 502 is hidden from view due to the presence of aircraft structure, such as a nose cone 506. FIG. 7 is a schematic representation of the scene shown in FIG. 6 after deployment of a transparent combiner 520 of a HUD system. The combiner 520 is held in position within the field of view defined by the windshield 500. The HUD system is controlled in the manner described above to project an appropriate HUD image 526 that includes the obstructed portion of the environment 502. For this example, the HUD image 526 includes a section of a road 530, and a vehicle 532 parked next to the road 530. The nose cone 506 obscures these features from plain sight, as depicted in FIG. 6. The HUD system, however, provides an enhanced visual experience to the viewing occupant by generating the HUD image 526 from image data captured by an imaging system that has a clear line of sight to the obscured terrain.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft comprising:
    a cockpit to accommodate an occupant;
    a windshield that defines a field of view for viewing an environment outside the cockpit;
    an aircraft structure outside the cockpit and visible within the field of view, wherein the aircraft structure visually obstructs a portion of the environment;
    an imaging system mounted to exterior structure of the aircraft and having a clear line of sight to the portion of the environment that is visually obstructed by the aircraft structure, the imaging system configured and operated to capture image data corresponding to the obstructed portion of the environment;

a controller configured to process the image data captured by the imaging system into a head-up display (HUD) image that represents the obstructed portion of the environment;

a HUD element configured to present projected images that are visible to the occupant; and a projector coupled to the controller and configured to project the HUD image toward the HUD element, such that the HUD image is visible overlying the aircraft structure;

wherein the controller is configured to adjust an image capture angle of the imaging system based on an eye or head location of the occupant, such that image data captured by the imaging system during flight of the aircraft is processed into the HUD image to register the HUD image with an unobstructed view of the environment outside the cockpit, and such that the HUD image appears to accurately merge with visible surroundings when perceived by the occupant; and wherein the controller reactively adjusts the image capture angle of the imaging system in response to changes in the eye or head location of the occupant.

2. The aircraft of claim 1, wherein the aircraft structure comprises a nose cone of the aircraft.

3. The aircraft of claim 2, wherein the imaging system comprises a camera having a captured field of view located below the nose cone.

4. The aircraft of claim 1, wherein the HUD element comprises a transparent combiner.

5. The aircraft of claim 4, wherein the HUD element is deployable on demand into the field of view defined by the windshield.

6. The aircraft of claim 1, wherein the HUD element is integrated into the windshield.

7. The aircraft of claim 1, wherein:
the imaging system comprises a left camera and a right camera; and
the controller processes image data captured by the left camera and image data captured by the right camera into a stereoscopic image.

8. A display system for a vehicle having a windshield and vehicle structure outside the windshield, wherein the vehicle structure is visible within a field of view defined by the windshield, the display system comprising:
a camera mounted to exterior structure of the vehicle and having a clear line of sight to capture image data for a visually obstructed portion of an environment outside the vehicle, wherein the visually obstructed portion of the environment is hidden by the vehicle structure;
a controller configured to process the image data captured by the camera into a head-up display (HUD) image that represents the visually obstructed portion of the environment;
a HUD element configured to present projected images that are visible to an occupant of the vehicle; and
a projector coupled to the controller and configured to project the HUD image toward the HUD element, such that the HUD image is visible overlying the vehicle structure;
wherein the controller is configured to adjust an image capture angle of the camera based on an eye or head location of the occupant, such that image data captured by the camera during operation of the vehicle is processed into the HUD image to register the HUD image with an unobstructed view of the environment outside the vehicle, and such that the HUD image appears to accurately merge with visible surroundings when perceived by the occupant; and
wherein the controller reactively adjusts the image capture angle of the camera in response to changes in the eye or head location of the occupant.

9. The display system of claim 8, wherein the HUD element comprises a transparent combiner.

10. The display system of claim 9, wherein the HUD element is deployable on demand into the field of view defined by the windshield.

11. The display system of claim 8, wherein the HUD element is integrated into the windshield.

12. A head-up display (HUD) system for a vehicle having a windshield and visually obstructing vehicle structure outside the windshield, wherein the vehicle structure is visible within a field of view defined by the windshield, the HUD system comprising:
a transparent combiner that is deployable into the field of view defined by the windshield, the transparent combiner configured to present projected images that are visible to an occupant of the vehicle;
a controller configured to process image data into a HUD image that represents a visually obstructed portion of an environment outside the vehicle, the image data captured by an imaging system mounted to exterior structure of the vehicle and having a clear line of sight to a captured field of view that is unobstructed by the visually obstructing vehicle structure; and
a projector coupled to the controller and configured to project the HUD image toward the transparent combiner, such that the HUD image is visible overlying the visually obstructing vehicle structure;
wherein the controller is configured to adjust an image capture angle of the imaging system based on an eye or head location of the occupant, such that image data captured by the imaging system during operation of the vehicle is processed into the HUD image to register the HUD image with an unobstructed view of the environment outside the vehicle, and such that the HUD image appears to accurately merge with visible surroundings when perceived by the occupant; and
wherein the controller reactively adjusts the image capture angle of the camera in response to changes in the eye or head location of the occupant.

13. The HUD system of claim 12, wherein:
the vehicle is an aircraft; and
the visually obstructing vehicle structure comprises a nose cone of the aircraft.

* * * * *